(12) United States Patent
Anderson et al.

(10) Patent No.: US 7,844,728 B2
(45) Date of Patent: Nov. 30, 2010

(54) PACKET FILTERING/CLASSIFICATION AND/OR POLICY CONTROL SUPPORT FROM BOTH VISITED AND HOME NETWORKS

(75) Inventors: Thomas W. Anderson, Naperville, IL (US); Chung-Zin Liu, Naperville, IL (US); Harold A. Lassers, Elmhurst, IL (US); Stinson S. Mathai, Wheaton, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 416 days.

(21) Appl. No.: 11/888,175

(22) Filed: Jul. 31, 2007

(65) Prior Publication Data

US 2009/0037999 A1 Feb. 5, 2009

(51) Int. Cl.
*G06F 15/16* (2006.01)
*G00F 9/00* (2006.01)
(52) U.S. Cl. .................. 709/233; 709/232; 709/237; 370/338; 370/401; 726/15
(58) Field of Classification Search .......... 709/230–237
See application file for complete search history.

(56) References Cited

U.S. PATENT DOCUMENTS

| 2003/0212900 | A1* | 11/2003 | Liu et al. ..................... 713/200 |
| 2004/0068668 | A1* | 4/2004 | Lor et al. ..................... 713/201 |
| 2004/0187021 | A1* | 9/2004 | Rasanen ...................... 713/200 |
| 2004/0208153 | A1* | 10/2004 | Mizell et al. ................ 370/338 |
| 2005/0272456 | A1* | 12/2005 | Yoshii et al. ................ 455/522 |
| 2006/0104284 | A1* | 5/2006 | Chen ........................ 370/395.3 |
| 2006/0126565 | A1* | 6/2006 | Shaheen ..................... 370/331 |
| 2006/0130136 | A1* | 6/2006 | Devarapalli et al. ........... 726/15 |

(Continued)

FOREIGN PATENT DOCUMENTS

EP 1770915 A1 4/2007

(Continued)

OTHER PUBLICATIONS

Kueh et al., Application of Context Transfer for Roaming in IP-Based Evolved 3G Networks, IEEE International Symposium on Personal, Indoor and Mobile Radio Communications (PIMRC '06), Sep. 1, 2006, 5 Pages.

(Continued)

*Primary Examiner*—Wing F Chan
*Assistant Examiner*—Razu A Miah
(74) *Attorney, Agent, or Firm*—Fay Sharpe LLP

(57) ABSTRACT

A method of supporting access to a selected Internet Protocol (IP) multimedia application via an IP Multimedia Subsystem (IMS) is provided for a roaming mobile node (MN)—i.e., user equipment (UE)served by a wireless telecommunications system. The method includes: includes establishing a first IP tunnel between the UE and a local access gateway of a visited network, the first tunnel being anchored at the local access gateway; establishing a second IP tunnel between the UE and a home gateway of a home network, the second tunnel being anchored at the home gateway; receiving data packets at the local access gateway for the UE; filtering the packets received at the local access gateway to suitably classify corresponding traffic into one of a plurality of data flows supported within the first tunnel at varying Quality of Service (QoS) levels; and filtering the received packets.

18 Claims, 2 Drawing Sheets

U.S. PATENT DOCUMENTS

| | | | |
|---|---|---|---|
| 2006/0182061 A1* | 8/2006 | Naghian | 370/331 |
| 2007/0255852 A1* | 11/2007 | McBride et al. | 709/246 |
| 2008/0095070 A1* | 4/2008 | Chan et al. | 370/254 |
| 2009/0010271 A1* | 1/2009 | Bachmann et al. | 370/401 |

FOREIGN PATENT DOCUMENTS

| | | |
|---|---|---|
| WO | 2008/110215 A1 | 9/2008 |

OTHER PUBLICATIONS

PCT/US2008/009179, International Search Report, Feb. 10, 2009, 4 Pages.

PCT/US2008/009179, Written Opinion of the International Searching Authority, Feb. 10, 2009, 5 pages.

* cited by examiner

PACKET FILTERING/CLASSIFICATION AND/OR POLICY CONTROL SUPPORT FROM BOTH VISITED AND HOME NETWORKS

FIELD

The present inventive subject matter relates to the art of wireless telecommunications networks. Particular application is found in conjunction with an Internet Protocol (IP) Multimedia Subsystem, and the specification makes particular reference thereto. However, it is to be appreciated that aspects of the present inventive subject matter are also amenable to other like networks, devices and/or applications.

BACKGROUND

As is known in the wireless telecommunication arts, an IP Multimedia Subsystem (IMS) is an architectural framework (originally designed by the wireless standards body 3rd Generation Partnership Project (3GPP)) for delivering IP multimedia to wireless mobile device users. That is to say, the IMS supports the use of IP multimedia applications and/or services within a wireless telecommunications system or network. Generally, IMS enables wireless network service providers and/or operators to offer their subscribers (i.e., mobile users) multimedia services based on and/or built upon Internet applications, services and/or protocols (e.g., including SIP (Session Initiation Protocol), which is used to manage the IP multimedia sessions).

Generally, in the field of wireless telecommunications and/or packet-switched networks, the term Quality of Service (QoS) relates to resource reservation control mechanisms. For example, these mechanisms provide different QoS levels and/or classifications to different users and/or data flows, or supply a certain level of performance to network traffic in accordance with established rules and/or policies. For example, some traffic types (such as real-time or interactive traffic) generally demand a higher QoS level to achieve adequate performance, while a lower QoS level may suffice for other types of traffic. At any given time there may be a limited amount of network resources available for the particular traffic load being experienced at that time. Accordingly, it is typically desirable to provide varied QoS levels to different data flows based upon the type of traffic each data flow represents so as to optimize resource allocation and/or management (e.g., including bandwidth dedication, jitter and/or latency control, loss characteristic management, etc.).

Commonly, the rules and/or policies for permitting access to various multimedia applications and/or services via the IMS and/or for setting or otherwise determining QoS levels are established with the aid of a Policy Control Rule Function (PCRF). The policy function generally coordinates the various network resources to provide requested services to authorized subscribers at the appropriate QoS levels. It is responsible for identifying the policy rules for the services that subscribers may intend using. The policy control architecture determines and enforces dynamic QoS and regulates access permission policies for the network infrastructure elements involved in providing a specific requested service. The PCRF is the node designated in real-time for the determination of the policy rules. For example, a set of policy rules can be activated to verify access permission, manage QoS etc., all in real-time. The PCRF enforces these policy rules through its interaction with a Policy Control Enforcement Function (PCEF) implemented at the access gateway node. The policy rules can be formulated based on static information (e.g., such as a subscription profile maintained in a Subscriber Policy Repository (SPR)), dynamic information, and the available resources. Accordingly, the combination of such rules, once met for a service request, can trigger a desired action; such as—allowing the service with the requested bandwidth or appropriate QoS level, or denying the service. This type of framework for the policy rules allows wireless network operators to deploy service logic while optimally utilizing the network resources.

With reference now to FIG. 1, there is shown relevant portions of a visited and a home telecommunications network. In a typical wireless or mobile roaming scenario, a multimedia enabled mobile node (MN), mobile terminal (MT) or mobile station (MS)—generally referred to herein as user equipment (UE) 10—may support two IP tunnels 20 and 22 to access selected IP multimedia applications and/or services, e.g., via the appropriate IMS. The use of two IP tunnels in this manner is commonly referred to as dual IP anchoring. As can be appreciated, each tunnel generally may carry various different types of traffic or data flows to and/or from the UE 10.

As illustrated, the first IP tunnel 20 is commonly anchored at the local or visited network, i.e., at a local access gateway 30. Generally, the tunnel 20 typically carries bearer traffic to and/or from the UE 10. By anchoring the tunnel 20 locally, bearer traffic routing can be optimized, e.g., by not having to backhaul this traffic to the home network. Accordingly, a reduction in transport and/or equipment costs and/or overhead can be realized. The second IP tunnel 22 is commonly anchored at the home network, i.e., at a home gateway 40. Generally, the tunnel 22 typically carries control signalling and/or application data to and/or from the UE 10. In this manner, the home network is more readily able to retain a significant degree of control over the IP multimedia applications and/or services accessed via the IMS by the UE 10.

However, in conventional embodiments, packet filtering and policy enforcement is only applied in and/or supported at the local access gateway 30 for traffic carried by the tunnel 20. As illustrated, this is achieved by a packet classification function and/or PCEF 32 implemented at the local access gateway 30. That is to say, generally, packet filtering is only applied in the local access gateway 30 to classify downlink traffic (i.e., traffic carried by the tunnel 20 to the UE 10) into a plurality of individual service or data flows (e.g., data flows 20*a*, 20*b*, ... 20*n*) each with an appropriate QoS level suited to the particular traffic type—e.g., best effort, real-time audio and video, etc. Similarly, policy enforcement is also only supported at the local access gateway 30, e.g., in accordance with policy rules propagated to the PCEF 32 from a SPR 50, a home PCRF (hPCRF) 52 and/or a visited PCRF (vPCRF) 54.

As can be appreciated from the illustrated architecture, packet classification and/or policy enforcement is traditionally not supported in the home gateway 40 for the tunnel 22. Rather, all types of "home traffic" are transported within the one tunnel 22. Consequently, the lack of QoS differentiation in the tunnel 22 can result in congestion and/or delays for otherwise high priority traffic and undesirably downgrade total resource efficiency.

Accordingly, a new and improved system and/or method is provided that overcomes the above-referenced problems and others.

SUMMARY

In accordance with one embodiment, a method of supporting access to a selected Internet Protocol (IP) multimedia application via an IP Multimedia Subsystem (IMS) is provided for a roaming mobile node (MN) served by a wireless telecommunications system. The method includes: establishing a first IP tunnel between the MN and a local access gateway of a visited network in which the MN is roaming, the first tunnel being anchored at the local access gateway; establishing a second IP tunnel between the MN and a home gateway of a home network to which the MN belongs, the second tunnel being anchored at the home gateway; receiving data packets at the local access gateway for the MN; filtering the packets received at the local access gateway to suitably classify corresponding traffic into one of a plurality of data flows supported within the first tunnel at varying Quality of Service (QoS) levels; receiving data packets at the home gateway for the MN; and, filtering the packets received at the home gateway to suitably classify corresponding traffic into one of a plurality of data flows supported within the second tunnel at varying QoS levels.

In accordance with another embodiment, a wireless telecommunications network provides roaming mobile user equipment (UE) served by the wireless telecommunications network access to a selected Internet Protocol (IP) multimedia application via an IP Multimedia Subsystem (IMS). The network includes: a local access gateway, the local access gateway being part of a visited network in which the UE is roaming; a first IP tunnel is established between the UE and the local access, the first tunnel being anchored at the local access gateway; a home gateway, the home gateway being part of a home network to which the UE belongs, a second IP tunnel established between the UE and the home gateway, the second tunnel being anchored at the home gateway; a first packet classification function implemented at the local access gateway, the first packet classification function being operative to filter data packets received at the local access gateway for the UE so as to suitably classify corresponding traffic into one of a plurality of data flows supported within the first tunnel at varying Quality of Service (QoS) levels; and, a second packet classification function implemented at the home gateway, the second packet classification function being operative filter data packets received at the home gateway for the UE so as to suitably classify corresponding traffic into one of a plurality of data flows supported within the second tunnel at varying QoS levels.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENT

For clarity and simplicity, the present specification shall refer to structural and/or functional elements, relevant communication standards, protocols and/or services, and other components that are commonly known in the art without further detailed explanation as to their configuration or operation except to the extent they have been modified or altered in accordance with and/or to accommodate the preferred embodiment(s) presented herein.

The present specification relates to providing a roaming wireless or mobile device access to selected IP multimedia applications and/or services via an IMS using a dual IP anchoring approach. More specifically, the specification describes a system and/or method for supporting QoS and/or access permission regulation and/or management for not only visited network traffic but also for home network traffic. The foregoing objective is suitably achieved by implementing additional packet filtering and/or policy enforcement support at the home gateway to which one of the IP tunnels is anchored.

Figure 1:
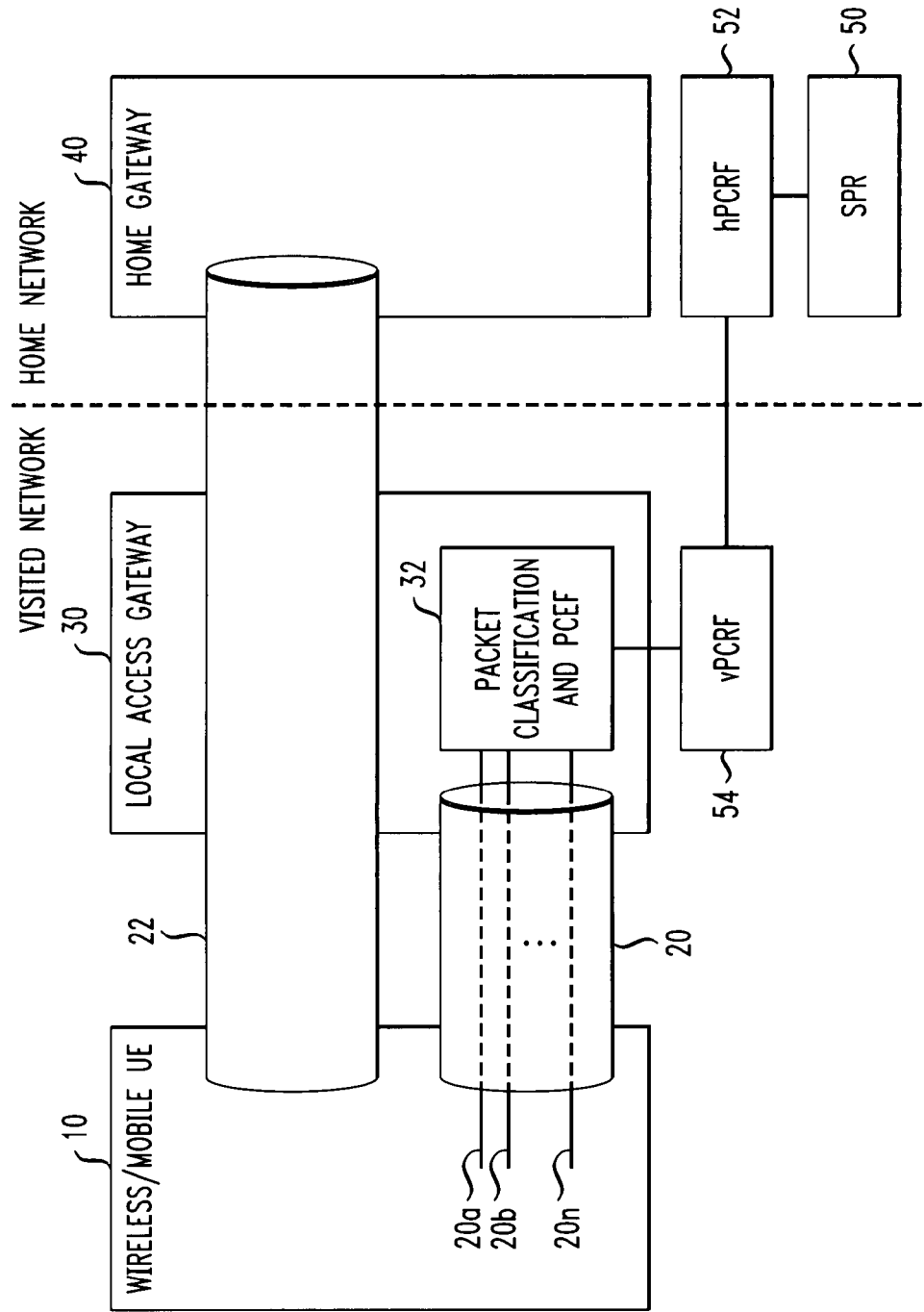
FIG. 1 is a block diagram illustrating a conventional network architecture implementing dual IP anchoring in connection with a wireless roaming scenario.
Figure 2:
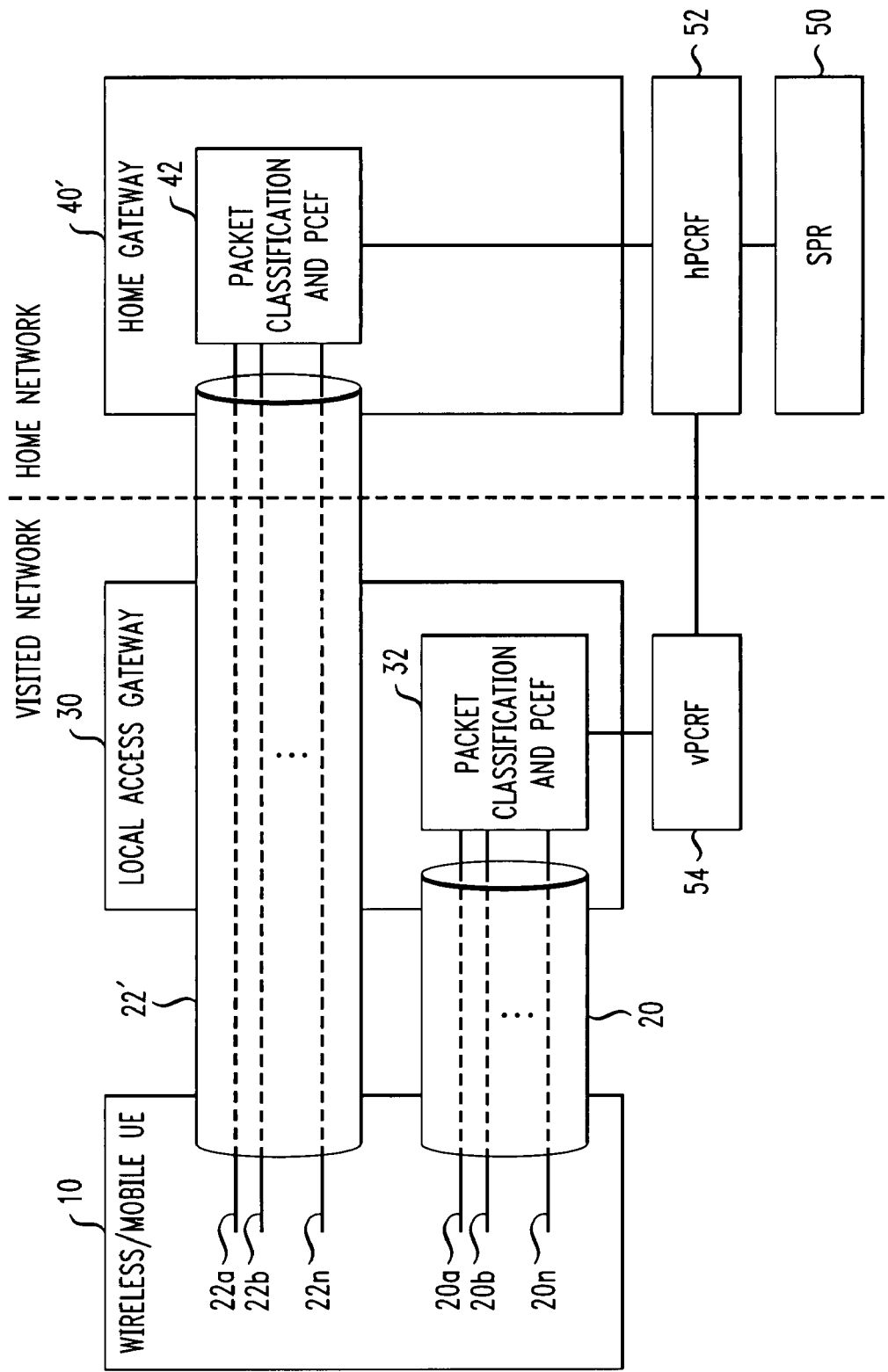
FIG. 2 is a block diagram illustrating an exemplary network architecture for implementing dual IP anchoring in connection with a wireless roaming scenario that is suitable for practicing aspects of the present inventive subject matter.

Turning attention now to FIG. 2, there is shown a telecommunications network architecture similar to the conventional one illustrated in FIG. 1, where like reference characters identify like elements. Notably, however, the exemplary embodiment shown in FIG. 2 differs from that of FIG. 1 insomuch as the home gateway 40' illustrated in the exemplary embodiment of FIG. 2 is equipped or otherwise provisioned with a packet classification function and/or PCEF 42, while the conventional home gateway 40 does not include or support such functions. Therefore, in accordance with the exemplary embodiment illustrated in FIG. 2, QoS and policy enforcement are applied and/or otherwise supported for both visited network and home network traffic. Conversely, in accordance with the conventional embodiment illustrated in FIG. 1, QoS and policy enforcement are only applied and/or otherwise supported for visited network traffic and not the home network traffic.

In particular, there is shown in FIG. 2 the relevant portions of a home telecommunications network and a visited network in which the UE 10 (e.g., a multimedia enabled MT, MS or other MN) is roaming. As illustrated, the UE 10 supports two IP tunnels 20 and 22' to access selected IP multimedia applications and/or services, e.g., via the appropriate IMS. The use of two IP tunnels in this manner, as indicated above, is commonly referred to as dual IP anchoring. As can be appreciated, each tunnel optionally carries various different types of traffic or data flows to and/or from the UE 10.

In the illustrated embodiment of FIG. 2, the first IP tunnel 20 is anchored at the local or visited network, i.e., at the local access gateway 30. Suitably, the tunnel 20 typically carries bearer traffic to and/or from the UE 10. The second IP tunnel 22' is anchored at the home network, i.e., at the home gateway 40'. Suitably, the tunnel 22' typically carries control signalling and/or application data to and/or from the UE 10.

In the usual manner, packet filtering and/or policy enforcement is applied in and/or otherwise supported at the local access gateway 30 for traffic carried by the tunnel 20. As illustrated, the foregoing is achieved by the packet classification function and/or PCEF 32 implemented at the local access gateway 30. For example, packet filtering is applied in the local access gateway 30 to classify downlink traffic (i.e., traffic carried by the tunnel 20 to the UE 10) into a plurality of individual service or data flows (e.g., data flows 20a, 20b, 20n) each with an appropriate QoS level suited to the particular traffic type—e.g., best effort, real-time audio and video, etc. Similarly, policy enforcement is also supported at the local access gateway 30, e.g., in accordance with policy rules propagated to the packet classification function and/or PCEF 32 from the SPR 50, the hPCRF 52 and/or the vPCRF 54.

Optionally, packet filtering and/or classification is carried out by the packet classification function and/or PCEF 32 implemented at the local access gateway 30 in the usual manner using what is commonly known as a Traffic Flow Template (TFT). Generally, a TFT is a series, e.g., of up to eight filters that allows traffic that matches the filters to be routed on a particular Packet Data Protocol (PDP) context. For example, the PDP context is a data structure representing a logical association between the UE 10 and a PDN (Public Data Network) running across a GPRS (General Packet Radio Service) network. The context defines aspects such as routing, QoS, etc. In practice then, when incoming data packets arrives at the local access gateway 30, the packet classification function implemented thereat makes a PDP context selection based on the TFT, and maps the incoming data packets to the correct PDP context, with specified QoS attributes.

In a Universal Mobile Telecommunication System (UMTS) as defined by the 3GPP, the aforementioned PDP is generally used in connection with the GPRS network. Of course alternately, the applicable access network or architecture may include Code Division Multiple Access (CDMA) and/or High Packet Rate Data (HPRD) systems, e.g., as defined by the Third Generation Partnership Program 2 (3GPP2). In this case, a Point-to-Point Protocol (PPP) is commonly employed between the MN (i.e., the UE 10) and the Packet Data Serving Node (PDSN) (i.e., the local access gateway 30), and in some instances, a non-PPP is used between the MN and PDSN in accordance with enhancements later adopted by the 3GPP2—e.g., to support Voice over IP (VoIP). In any event, it is to be appreciated that the present inventive subject matter is also applicable to such alternate networks, architectures and/or communication protocols.

Additionally, in accordance with the exemplary embodiment illustrated in FIG. 2, packet filtering and/or policy enforcement is also applied in and/or otherwise supported at the home gateway 40' for traffic carried by the tunnel 22'. As illustrated, this is achieved by a packet classification function and/or PCEF 42 implemented at the home gateway 30. For example, packet filtering is applied in the home gateway 40' to classify downlink traffic (i.e., traffic carried by the tunnel 22' to the UE 10) into a plurality of individual service or data flows (e.g., data flows 22a, 22b, . . . 22n) each with an appropriate QoS level suited to the particular traffic type— e.g., best effort, real-time audio and video, etc. Similarly, policy enforcement is also supported at the home gateway 40', e.g., in accordance with policy rules propagated to the PCEF 42 from the SPR 50 and/or the hPCRF 52.

More specifically, in accordance with the exemplary embodiment of FIG. 2, the plurality of data flows 22a, 22b, . . . 22n are allocated with varying QoS levels within the IP tunnel 22' established between the UE 10 and the home gateway 40'. Accordingly, incoming traffic received by the home gateway 40' for the UE 10 is filtered by the packet classification function and/or PCEF 42 to classify the traffic into one of the data flows 22a, 22b, . . . 22n having the appropriate QoS level for the particular type of traffic in question. Suitably, the aforementioned filtering is performed based upon a standard IP 5-tuple address associated with the UE 10.

Generally, each packet of data received by the home gateway 40' includes a header that commonly contains the standard IP 5-tuple address—e.g., including a source IP address, a source port, a destination IP address, a destination port and protocol identification. In practice then, the packet classification function and/or PCEF 42 optionally monitors the packet headers to detected the value of the 5-tuple address, and based on this information, sets or otherwise determines the appropriate QoS level for the packet, e.g., in accordance with policy rules propagated to the PCEF 42 from the SPR 50 and/or the hPCRF 52. Optionally, in accordance with the foregoing determination, the packet is marked or otherwise tagged so as to be routed or otherwise directed into one of the data flows 22a, 22b, . . . 22n that has and/or otherwise supports the corresponding QoS. Suitably, an appropriate field in the packet header is marked or set to indicate or otherwise reflect the desired and/or appropriate QoS for the packet—e.g., the Type of Service (ToS) byte, the Differentiated Services Code Point (DSCP), Class of Service (CoS) field, etc. are optionally so marked or set. Accordingly, the packets with similarly identified QoS designations are suitably aggregated into the same data flow, i.e., one of the data flows 22a, 22b, . . . 22n that has and/or otherwise supports the corresponding QoS. In this manner, the establishment of QoS differentiation in the tunnel 22' generally results in more efficient resource allocation and/or use and/or tends to alleviate congestion and/or delays for otherwise higher priority traffic from the home network.

While not shown in FIG. 2, it is to be appreciated that in practice the IP tunnel 22' established between the home gate 40 and the UE 10 tunnels and/or otherwise extends or passes through one or more various types of networks and/or network subsystems, e.g., such as a Radio Access Network (RAN). The aforementioned networks or network subsystems through which the tunnel 22' passes can be viewed as generally residing external to or outside of the IP tunnel 22'. That is to say, the data flows 22a, 22b, . . . 22n allocated within the IP tunnel 22' are typically transparent to the external or outer networks and/or network subsystems through which the tunnel 22' is established. Accordingly, the home gateway 40 is optionally provisioned to inform the external or outer networks of the particular QoS levels for the data flows 22a, 22b, . . . 22n carried within the tunnel 22' at any given time. Suitably, for example, this is accomplished by transmitting or otherwise communicating the DSCP values from the headers of the packets forming the data flows 22a, 22b, . . . 22n carried within the tunnel 22' at the particular time in question. Accordingly, the external or outer networks and/or network subsystems through which the tunnel 22' is established are able to allocate resources and/or otherwise select a QoS for the "outer" tunnel 22' (e.g., by appropriately setting the DSCP in the external or outer networks and/or network subsystems to correspond to the DSCP value communicated thereto by the home gateway 40) in such a manner so as to sufficiently support—suitably, on a per packet basis—the QoS levels for the otherwise transparent data flows 22a, 22b, . . . 22n carried within the tunnel 22' at any given time.

In conclusion, it is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for providing a roaming mobile node (MN) served by a wireless telecommunications system access to a selected Internet Protocol (IP) multimedia application via an IP Multimedia Subsystem (IMS), said method comprising:
   (a) establishing a first IP tunnel between the MN and a local access gateway of a visited network in which the MN is roaming, said first tunnel being anchored at said local access gateway;
   (b) establishing a second IP tunnel between the MN and a home gateway of a home network to which the MN belongs, said second tunnel being anchored at said home gateway;
   (c) receiving data packets at the local access gateway for the MN;
   (d) filtering the packets received at the local access gateway to classify corresponding traffic into one of a plurality of data flows supported within the first tunnel at varying Quality of Service (QoS) levels;
   (e) receiving data packets at the home gateway for the MN;
   (f) filtering the packets received at the home gateway to classify corresponding traffic into one of a plurality of data flows supported within the second tunnel at varying QoS levels; and
   (g) communicating from the home gateway to at least one of a network or network subsystem through which the second tunnel is established a QoS indication reflecting the QoS for one or more of the data flows currently supported within the second tunnel; and
   (h) providing policy enforcement at the home gateway in accordance with one or more policy rules that regulate at least one of access permission to the IP multimedia application and establishment of Qos levels for the data flows supported within the second tunnel.

2. The method of claim 1, said method further comprising:
   providing policy enforcement at the local access gateway in accordance with one or more policy rules that regulate at least one of access permission to the IP multimedia application and establishment of QoS levels for the data flows supported within the first tunnel.

3. The method of claim 2, said method further comprising:
   promulgating the policy rules to an enforcement function implemented at the local access gateway to provide said policy enforcement, said policy rules being promulgated from at least one of a Subscriber Policy Repository (SPR) containing a subscription profile associated with the MN, a Policy Control Rule Function (PCRF) of the home network, and a PCRF of the visited network.

4. The method of claim 1, said method further comprising:
   promulgating the policy rules to an enforcement function implemented at the home gateway to provide said policy enforcement, said policy rules being promulgated from at least one of a Subscriber Policy Repository (SPR) containing a subscription profile associated with the MN and a Policy Control Rule Function (PCRF) of the home network.

5. The method of claim 1, wherein said communicating comprises:
   copying a QoS level from inside the second tunnel to a Differentiated Services Code Point (DSCP) outside the second tunnel in order to apply a corresponding QoS level in at least one of the network or network subsystem through which the second tunnel is established.

6. The method of claim 1, wherein the filtering of packets at the home gateway is based upon a 5-tuple address containing in a header of each packet, said 5-tuple address including:
   a source IP address,
   a source port,
   a destination IP address,
   a destination port and
   a protocol identification.

7. The method of claim 1, wherein the filtering of packets at the local access gateway is executed using a Traffic Flow Template (TFT) comprising a series filters that allows traffic that matches the filters to be routed on a particular Packet Data Protocol (PDP) context, said PDP context being a data structure representing a logical association between the MN and a PDN (Public Data Network) which defines aspects of the association, said aspects relating to at least one of traffic routing and QoS.

8. A wireless telecommunications network providing roaming mobile user equipment (UE) served by the wireless telecommunications network access to a selected Internet Protocol (IP) multimedia application via an IP Multimedia Subsystem (IMS), said network comprising:
   a local access gateway, said local access gateway being part of a visited network in which the UE is roaming;
   a first IP tunnel is established between the UE and the local access, said first tunnel being anchored at said local access gateway;
   a home gateway, said home gateway being part of a home network to which the UE belongs,
   a second IP tunnel established between the UE and the home gateway, said second tunnel being anchored at said home gateway;
   a first packet classification function implemented at the local access gateway, said first packet classification function being operative to filter data packets received at the local access gateway for the UE so as to classify corresponding traffic into one of a plurality of data flows supported within the first tunnel at varying Quality of Service (QoS) levels; and
   a second packet classification function implemented at the home gateway, said second packet classification function being operative to filter data packets received at the home gateway for the UE so as to classify corresponding traffic into one of a plurality of data flows supported within the second tunnel at varying QoS levels; and
   a policy enforcement function implemented at the home gateway, said policy enforcement function being operative to regulate in accordance with policy rules at least one of access permission to the IP multimedia application and establishment of QoS levels for the data flows supported within the second tunnel;

wherein the second tunnel is established through at least one of an external network or an external network subsystem such that the data flows supported in the second tunnel are transparent thereto;

wherein the home gateway is provisioned to inform at least one of the external network or the external network subsystem of the QoS level of at least one of the data flows currently being supported within the second tunnel.

9. The network of claim 8, said network further comprising:
   a policy enforcement function implemented at the local access gateway, said policy enforcement function being operative to regulate in accordance with policy rules at least one of access permission to the IP multimedia application and establishment of QoS levels for the data flows supported within the first tunnel.

10. The network of claim 9, said network further comprising:
    at least one of a Subscriber Policy Repository (SPR) containing a subscription profile associated with the UE, a Policy Control Rule Function (PCRF) of the home network, and a PCRF of the visited network, from which the policy rules are promulgating to the policy enforcement function.

11. The network of claim 8, said network further comprising:
    at least one of a Subscriber Policy Repository (SPR) containing a subscription profile associated with the UE, and a Policy Control Rule Function (PCRF) of the home network, from which the policy rules are promulgating to the policy enforcement function.

12. The network of claim 8, wherein the home gateway copies a QoS level from inside the second tunnel to a Differentiated Services Code Point (DSCP) employed by at least one of the external network or the external network subsystem such that a corresponding QoS is applied outside the second tunnel.

13. The network of claim 8, wherein the second packet classification function filters packets at the home gateway based upon a 5-tuple address contained in a header of each packet, said 5-tuple address including: a source IP address, a source port, a destination IP address, a destination port and a protocol identification.

14. The network of claim 8, wherein the first packet classification function filters packets at the local access gateway using a Traffic Flow Template (TFT) comprising a series filters that allows traffic that matches the filters to be routed on a particular Packet Data Protocol (PDP) context, said PDP context being a data structure representing a logical association between the UE and a PDN (Public Data Network) which defines aspects of the association, said aspects relating to at least one of traffic routing and QoS.

15. The wireless telecommunications network of claim 8, further comprising:
    filtering the packets received at the home gateway to classify corresponding traffic into one of a plurality of data flows supported within the second IP tunnel at varying QoS levels.

16. A method for providing a mobile node (MN) access to a selected Internet Protocol (IP) multimedia application, comprising:
    (a) establishing a first bi-directional IP tunnel between the MN and a local access gateway of a visited network in which the MN is roaming, the first tunnel being anchored at the local access gateway;
    (b) establishing a second bi-directional P tunnel between the MN and a home gateway of a home network to which the MN belongs, the second tunnel being anchored at the home gateway;
    (c) receiving data packets at the local access gateway for the MN;
    (d) filtering the packets received at the local access gateway to classify corresponding traffic into one of a plurality of data flows supported within the first tunnel at varying Quality of Service (QoS) levels;
    (e) receiving data packets at the home gateway for the MN; and,
    (f) providing policy enforcement at the home gateway in accordance with one or more policy rules that regulate at least one of access permission to the IP multimedia application and establishment of QoS levels for the data flows supported within the second tunnel.

17. The method of claim 16, further comprising:
    (g) filtering the packets received at the home gateway to classify corresponding traffic into one of a plurality of data flows supported within the second tunnel at varying QoS levels.

18. The method of claim 16, further comprising:
    (g) communicating from the home gateway to at least one of a network or network subsystem through which the second tunnel is established a QoS indication reflecting the QoS for one or more of the data flows currently supported within the second tunnel.

* * * * *